United States Patent Office 3,250,755
Patented May 10, 1966

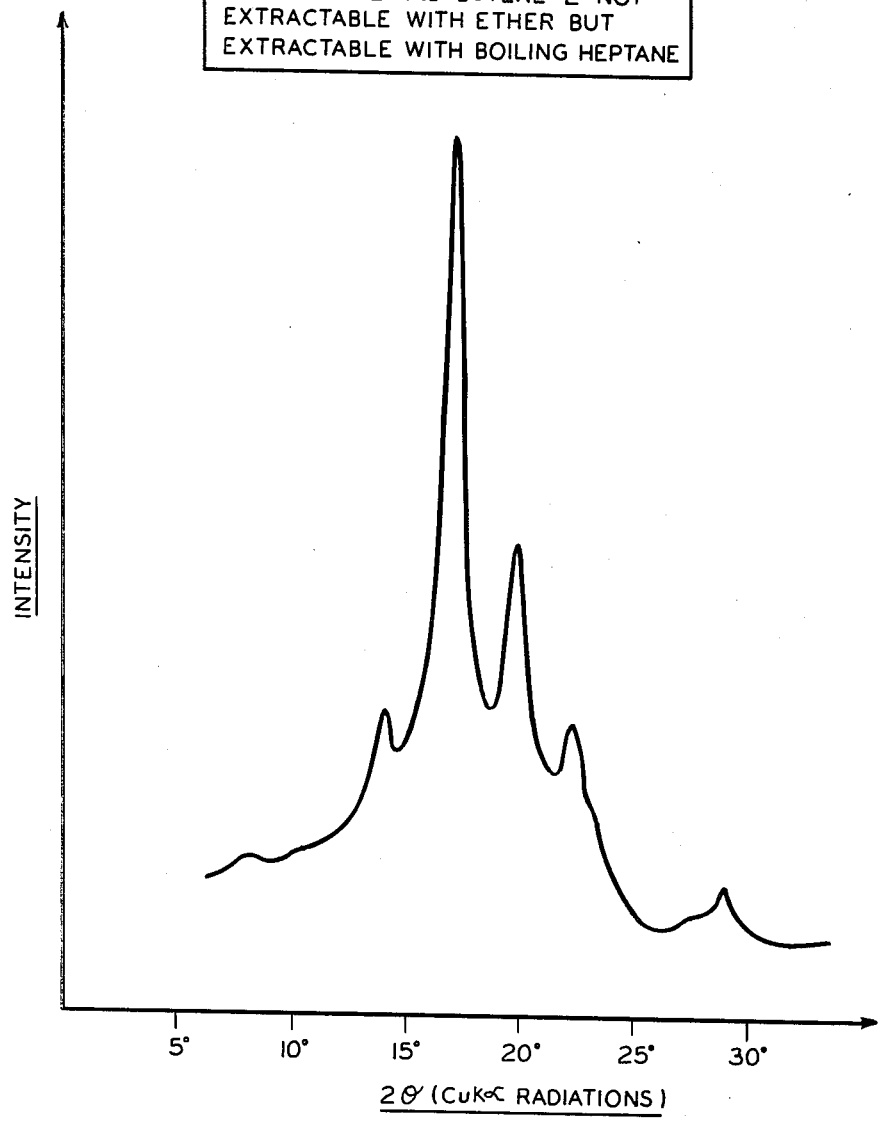

3,250,755
COPOLYMER OF BUTENE-2 AND ETHYLENE
Giulio Natta, Gino Dall'Asta, Giorgio Mazzanti, Italo Pasquon, Alberto Valvassori, and Adolfo Zambelli, all of Milan, Italy, assignors to Montecatini Società Generale per l'Industria Mineraria e Chimica, a corporation of Italy
Filed Mar. 19, 1962, Ser. No. 181,234
Claims priority, application Italy, Mar. 21, 1961, 5,222/61
22 Claims. (Cl. 260—88.2)

The present invention relates to new high molecular weight, linear polymeric products. More particularly, the present invention relates to polymeric products of macromolecules in which recur the sequences of single chemical units corresponding to the general formula:

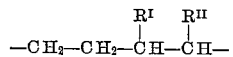

wherein $R^I$ and $R^{II}$ may be alkyl, aryl, or alkylaryl, or which contain such units alternating with sequences of an even number of methylene groups.

According to the nomenclature proposed by M. L. Huggins, J. Polymer Sci. 8, 257 (1952), such polymeric products are defined as poly-(3,4-disubstituted butamers) and poly-(3,4-disubstituted butamers-co-ethamers).

The present invention also relates to a process for the preparation of the above mentioned polymeric products. This process is based upon the copolymerization of ethylene with an olefin containing an internal double bond and corresponding to the general formula:

$$R^I\text{---}CH=CH\text{---}R^{II}$$

wherein $R^I$ and $R^{II}$ have the above assigned values.

Hitherto the possibility of preparing linear copolymers having a high molecular weight from olefins containing an internal unsaturation and ethylene could not be foreseen.

The more usual coordinate anionic catalysts for low pressure polymerization of ethylene and a higher alpha-olefin are typically transition metal compounds and organometallic compounds of Group I, II and III of the Periodic Table. However, such anionic catalysts do not promote the polymerization of olefins containing internal double bonds.

We have now surprisingly found that by using certain special catalyst systems, it is possible to prepare linear, high molecular weight copolymers of olefins having the general formula:

$$R^I\text{---}CH=CH\text{---}R^{II}$$

(wherein $R^I$ and $R^{II}$ have the previously mentioned values) with ethylene. An object of the present invention is therefore the obtaining of linear high molecular weight copolymers of olefins having an internal double bond corresponding to the general formula:

$$R^ICH=CHR^{II}$$

(wherein $R^I$ and $R^{II}$ may be alkyl containing up to 6 carbon atoms, aryl, or alkylaryl) with ethylene.

Among the olefins containing internal unsaturation which, according to the present invention, can be copolymerized together with ethylene, are included the following: butene-2; pentene-2; trimethylethylene; hexene-2; heptene-2; heptene-3; 2-methylheptene-3; 2,7-dimethyl-octene-4; propenylbenzene; 1-phenylbutene-2; 5-phenylpentene-2; cis- and trans-stylbene etc.

Also, mixtures of the two cis and trans isomers of a specified olefin containing a double internal bond, or the two isomers in the pure state, can be used according to the present invention.

The polymeric products of the present invention are made up of macromolecules which is reality consist of a recurring regular sequence of units having the structure:

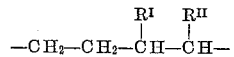

wherein $R^I$ and $R^{II}$ are as previously defined, or which contain such units alternating with sequences of an even number of methylene groups.

While one might speculate that in the macromolecules of the polymeric products of the present invention there would occur successive sequences of two or more monomeric units derived from the polymerization of the olefin containing internal unsaturation, in fact, such successive sequence never occurs.

Indeed, such olefin containing internal unsaturation does not form a homopolymer in the presence of the catalysts used in the process of our invention. Furthermore, no matter how low the ratio is between the moles of ethylene to the moles of olefin of the formula $R^I\text{---}CH=CH\text{---}R^{II}$ (this molar ratio occurring in the liquid phase, in which phase the copolymerization occurs), one can never obtain a copolymer containing more than 50% of monomeric units derived from the olefin having the internal double bond.

Examination by infrared spectrography of copolymers obtained by using very high molar ratios of olefin with internal unsaturation to ethylene and containing equimolar amounts of the two monomeric units, confirms that such copolymers consist of macromolecules having a regular chemical structure, in which the units with repeating sequences correspond to the general formula:

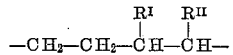

For instance, the infrared spectrum of an ethylene/butene-2-cis copolymer containing about 50% by moles of butene-2, shows absorption bands at 13.2$\mu$ attributable to sequences of two methylene groups to be readily visible, while absorption due to longer sequences of methylene groups does not practically appear.

A further object of the present invention is a process for the copolymerization of ethylene with an olefin containing an internal double bond and of the formula:

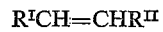

(wherein $R^I$ and $R^{II}$ have the previously defined values) to linear, high molecular weight copolymers, this process being carried out in the presence of suitable catalysts, to be more fully defined hereinafter. The catalysts which may be used in the above mentioned copolymerization process can be prepared from a compound of a transition metal from Groups IV, V, and VI of the Periodic Table and an organometallic compound of a metal from Groups Ia, II and IIIa of the Periodic Table.

Preferably catalytic systems are used which are colloidally dispersed or wholly dissolved in the liquid phase in which the copolymerization reaction takes place.

Suitable transition metal compounds which may be used in the preparation of the catalysts include $TiCl_4$; $TiI_4$; $TiCl_3$, prepared by reduction of $TiCl_4$ with hydrogen, aluminum, or an alkyl aluminum; $VCl_4$; $VOCl_3$; vanadium triacetylacetonate, vanadyl diacetylacetonate, ethyl orthovanadate; chromyl chloride; chrome triacetylacetonate; vanadyl halogen alcoholates, etc.

Suitable organometallic compounds include $Al(C_2H_5)_3$; $Al(C_4H_9)_2Cl$; $Al(C_3H_7)_2Br$; $Al(C_2H_5)_2I$; $Be(C_2H_5)_2$; $Li(C_4H_9)$; $[Al(C_2H_5)X_2]_2Y$ wherein X is a halogen and Y is an electron donor compound such as a tertiary or secondary amine, an "onium" salt or an alkali halide; etc.

Particularly satisfactory results are obtained when using as transition metal compounds certain vanadium compounds. The preferred catalytic systems are in fact prepared from vanadium tetrachloride or vanadium oxytrichloride and alkyl aluminum, or from vanadium triacetylacetonate and dialkyl aluminum monohalides.

Vanadyl diacetylacetonates, vanadium chloroacetylacetonates or the alkyl ortho-vanadates can be used instead of vanadium triacetylacetonate with satisfactory results.

According to the present invention, the copolymerization can be carried out in a rather wide temperature range of from about −80 to +100° C., but more preferably from about −50 to +50° C.

The copolymerization can be carried out in the presence of an inert solvent, such as an aliphatic or aromatic hydrocarbon, or in the absence of such solvent.

In order to obtain copolymers having as homogeneous a composition as possible, it is advisable to maintain constant during the copolymerization reaction the ratio between the concentrations of the two olefins which are to be polymerized in the liquid phase.

For this purpose it may be advisable to carry out the copolymerization continuously by feeding and discharging continuously or circulating at sufficiently high spatial velocities the mixture of the two monomers which are to be copolymerized.

All the copolymerization products of the present invention are copolymers, and exhibit properties very different from those of polyethylene. Naturally, the properties of our new copolymers depend on the content in the copolymerization product of the olefin having internal unsaturation.

The copolymer composition can be varied by suitably varying the composition of the mixture of the starting monomers. Thus, for instance, in the copolymerization of ethylene with butene-2 (see Examples 1–12), when the molar content of butene-2 in the copolymer is lower than 20%, products are obtained which still show a crystallinity of the polyethylene type when they are examined by X-ray analysis; however, such crystallinity is lower than that of the ethylene homopolymer obtained under the same conditions. Such crystallinity decreases rapidly, until it practically completely disappears when the butene-2 precentage increases.

Also, the infrared absorption spectrum of such ethylene-butene-2 copolymers is very different from that of the ethylene homopolymer and shows the characteristic bands of the methyl groups.

The absence of the absorption bands attributable to ethyl groups demonstrates that butene-2 is really copolymerized, and gives monomeric units of the type:

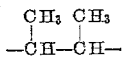

and that before the copolymerization no isomerization of butene-2 to butene-1 has occurred.

When the butene-2 percentage in the copolymer increases to over 30 mole percent, raw products are obtained from which it is possible to separate fractions containing 50% by moles of butene-2, the composition of which corresponds to a copolymer in which the two monomers are present in equimolar amounts.

Furthermore, crude copolymers prepared according to the present invention, which copolymers have a butene-2 content equal to or a little lower than 50%, exhibit a crystallinity under X-ray examination not attributable to polyethylene, and, after extraction with boiling solvents, give fractions in which the butene-2 content is practically equal to 50%, regardless of the type of the solvent used.

By fractionation by means of successive extractions with boiling solvents, it is possible to separate fractions which show a high crystallinity on X-ray examination. For instance, by extraction with ether and then with boiling hexane, of ethylene-butene-2-cis copolymers containing from 35 to 45% by moles of butene-2-cis, the fractions extracted (corresponding to 65–90% of the total polymer), show crystallinity on X-ray examination. Particularly, the fraction which is not extractable with ether, but which can be extracted with hexane, is very crystalline and shows a characteristic diffraction pattern very different from that of the linear polyethylene, this pattern being shown in the attached figure.

Considering the nature of monomeric units derived from butene-2, the crystalline structure of the copolymer, and the examination under infrared spectrograph which showed only the presence of single —CH$_2$—CH$_2$— groups, and bearing in mind that no crude copolymer or fraction which has been prepared by applicants contained more than 50% by weight of butene-2, one must conclude that the macromolecules which form this fraction (which is not extractable with ether but which can be extruded with hexane), consist, at least for a long portion, of monomeric units of ethylene and butene-2-cis regularly alternating with one another and sterically ordered.

The new polymeric products of the present invention can be employed as plastic materials (fibers, films and other manufactured articles) when they consist of crystalline products, or as elastomers when they consist of completely amorphous products.

The following examples are given to further illustrate the invention.

EXAMPLES 1–12

A copolymerization reaction vessel is provided which consists of a 200 ml. glass cylindrical apparatus having a side tube provided with a cock which permits the feeding of ethylene. The air is wholly removed from said vessel by means of anhydrous nitrogen. The reaction vessel is then completely immersed in a bath maintained at a constant temperature of −30° C. The vessel is then stirred by means of an agitating stirrer (90–100 shakes/minute).

Into the apparatus are introduced, according to the particular example (see Table 1):

(1) 10 g. (0.179 mole) pure cis-butene-2 or
(2) 10 g. (0.179 mole) pure trans-butene-2.

Then, according to the particular example (see Table 1), one of the following catalysts, prepared immediately before the beginning of the run at −30° C. under nitrogen, are introduced:

(1) A catalyst prepared by adding 9.0 millimoles tri-n-hexyl aluminum to a solution containing 3.6 millimoles vanadium tetrachloride in 30 ml. anhydrous n-heptane; or
(2) A catalyst prepared by adding 14 millimoles diethyl-aluminum-monochloride to a solution consisting of 2.8 millimoles vanadium triacetylacetonate in 30 ml. anhydrous toluene.

After butene-2 and the catalytic system is introduced into the polymerization vessel (at −30° C.), an absolute total pressure of 750 torr is established with nitrogen. After the apparatus is stirred, it is joined, by opening the cock, with a vessel containing radioactive ethylene having a known specified activity. The absolute total pressure in the reactor is maintained by means or a scrubber filled with butyl phthalate, according to the particular example (see Table 1), at a pressure of:

(1) 800 torr; or
(2) 850 torr; or
(3) 950 torr

Therefore, in the polymerization vessel, in the three above mentioned cases, the following initial partial pressures are:

(1) Ethylene partial pressure=50 torr partial nitrogen pressure+solvent+butene-2=750 torr.
(2) Ethylene partial pressure=100 torr partial nitrogen pressure+solvent+butene-2=750 torr.
(3) Ethylene partial pressure=200 torr partial nitrogen pressure+solvent+butene-2=750 torr.

Since the conversion of butene-2 is rather small, the variations with time of the ratio between the concentrations of ethylene and butene-2 are very slight.

The duration of the polymerization in Examples 1 to 12 is 8 hours and 15 minutes. The equilibrium between ethylene in the gaseous phase and that in the liquid phase is always assured by the efficient stirring.

The copolymerization is stopped by pouring the reaction product into an excess of methanol (500 ml.) containing 5 ml. of concentrated hydrochloric acid (38%). After some hours, the precipitated copolymer is filtered, washed with hot methanol and dried under reduced pressure 11 mm. Hg, at 50–60° C.

The ethylene content is determined by radiochemical technique. The butene-2 content is directly determined or is confirmed by means of infrared analysis by determining the intensity of the absorption of the methyl groups at $7.25\mu$.

The absence of absorption between $13\mu$ and $13.2\mu$ enables one to exclude the presence of ethyl groups due to the presence in the copolymer of monomeric units of butene-1, deriving from a hypothetical isomerization under the polymerization conditions of butene-2 into butene-1.

The polymerization conditions of Examples 1–12 and the results obtained are reported in Table 1.

The results of the fractionation of the copolymers of Examples 1–12 are reported in Table 2.

Table 2
FRACTIONATION OF BUTENE-2/ETHYLENE COPOLYMERS

| Example No. | Ether extract, percent by weight | n-Hexane extract, percent by weight | n-Heptane extract, percent by weight | Residue after extraction, percent by weight |
|---|---|---|---|---|
| 1 | 39.3 | 42.3 | 8.8 | 9.6 |
| 2 | 81.5 | 5.5 | 12.3 | 0.7 |
| 3 | 49.5 | 6.4 | 19.5 | 24.6 |
| 4 | 8.6 | 8.4 | 68.6 | 14.4 |
| 5 | 42.8 | 28.3 | 10.4 | 18.5 |
| 6 | 30.7 | 36.4 | 29.8 | 3.1 |
| 7 | 32.6 | 3.3 | 27.7 | 36.4 |
| 8 | 5.4 | 3.4 | 54.9 | 36.3 |
| 9 | 46.7 | 12.9 | 15.4 | 25.0 |
| 10 | 41.3 | 18.0 | 24.0 | 17.7 |
| 11 | 16.7 | 5.1 | 25.6 | 52.6 |
| 12 | 1.6 | 2.5 | 29.5 | 66.4 |

All the residues after the extraction referred to in Table 2 have a butene-content by moles of 2–5%. They show a polyethylene type crystallinity which is slight as compared to the crystallinity of a linear pure polyethylene obtained in the presence of the catalyst described in the present invention.

Table 1
COPOLYMERIZATION OF BUTENE-2 WITH ETHYLENE

| Example No. | Butene-2 isomer used | Catalyst | Partial pressure of $C_2H_4$, torr. | G. of copolymer obtained | Intrinsic Viscosity [a] $[\eta]$ in tetralin | Percent molar butene-2 [b] |
|---|---|---|---|---|---|---|
| 1 | cis | $VCl_4/Al(C_6H_{11})_3$ | 50 | 2.16 | 1.75 | 40.5 |
| 2 | cis | $V(acac)_3$[c]$/Al(C_2H_5)_2Cl$ | 50 | 1.55 | 0.58 | 32.5 |
| 3 | trans | $VCl_4/Al(C_6H_{11})_3$ | 50 | 1.26 | 1.31 | 19 |
| 4 | trans | $V(acac)_3/Al(C_2H_5)_2Cl$ | 50 | 0.82 | 1.17 | 8 |
| 5 | cis | $VCl_4/Al(C_6H_{11})_3$ | 100 | 3.83 | 1.44 | 38 |
| 6 | cis | $V(acac)_3/Al(C_2H_5)_2Cl$ | 100 | 2.91 | 1.27 | 20 |
| 7 | trans | $VCl_4/Al(C_6H_{11})_3$ | 100 | 2.44 | 2.04 | 16 |
| 8 | trans | $V(acac)_3/Al(C_2H_5)_2Cl$ | 100 | 1.74 | 1.92 | 6 |
| 9 | cis | $VCl_4/Al(C_6H_{11})_3$ | 200 | 6.14 | 2.77 | 22 |
| 10 | cis | $V(acac)_3/Al(C_2H_5)_2Cl$ | 200 | 5.16 | 2.00 | 10.5 |
| 11 | trans | $VCl_4/Al(C_6H_{11})_3$ | 200 | 4.63 | 2.44 | 10 |
| 12 | trans | $V(acac)_3/Al(C_2H_5)_2Cl$ | 200 | 4.38 | 3.14 | 4 |

[a] Determined at 135° C.
[b] Average value calculated on the basis of infrared analysis and radiochemical determination.
[c] $V(acac)_3$ = vanadium triacetylacetonate.

The products obtained according to the conditions reported in Table 1 consist of copolymers more or less rich in butene-2.

In all of these examples the non-fractionated polymers show, on X-ray examination, an ethylene type of crystallinity, which is reduced in comparison to the crystallinity of polyethylene obtained under the same conditions. Furthermore, the highest diffraction intensity of the amorphous fraction present is, according to the butene-2 content, more or less shifted toward higher reticular distances in comparison with the diffraction maximum of amorphous polyethylene.

In some cases (as in Examples 1 and 5), in addition to a slight crystallinity of the polyethylene type and the above mentioned displacement of the diffraction maximum of the amorphous fraction, one or more peaks of crystallinity are observed which cannot be attributed to polyethylene.

The above mentioned copolymers can be fractioned, for instance, by means of successive extractions with boiling solvents having an increasing boiling point. For instance, it is possible to separate the following fractions:

Ether extract
n-Hexane extract
n-Heptane extract
Residue after the extraction

The n-heptane extracts referred to in Table 2 have a butene-2 content by moles of 5–15%. They also exhibit only a slight crystallinity of the polyethylene type, which crystallinity is scarcely noticeable.

The n-hexane extracts referred to in Table 2 have a butene-2 content by moles of 14–50%. They are powder-like or wax-like. When their content of butene by moles is between 14 and 25% they consist of copolymers of butene-2 and ethylene which show, on X-ray examination, a very slight polyethylene type crystallinity. When, on the contrary, the content of butene-2 by moles reach 45–50%, generally a very clear change of the properties is observed. In this case the polymer is powder-like and when it is in the form of film it also shows elastic properties.

The copolymers insoluble in either but which can be extracted with hexane, containing about 50% (moles) of butene-2, have generally a very high crystallinity, of a type wholly different from that of polyethylene. The diffraction spectrum on X-ray ($CuK\alpha$ radiations) of such copolymer fraction (which cannot be extracted with ether but which can be extracted with boiling hexane) when dried at about 80° C. under reduced pressure, (see the attached figure showing a Geiger-counter registration of the X-ray spectrum of ethylene-cis-butene-2 alternating copolymer: abscissa=$2\vartheta$ ($CuK\alpha$-radiations), ordinate =intensity) presents the main diffractions for the $2\vartheta$ angles equal to 14.1°; 17.2°; 20.0°; 22.4°; 29.0°. The crystallinity of such copolymer fraction disappears at about 130° C., and therefore the melting point, from the crystallographic point of view, is about 130° C. or a little higher. The chemical structure of the macromolecules of this fraction corresponds to the chemical structure of a copolymer of alternating ethylene and butene-2 units:

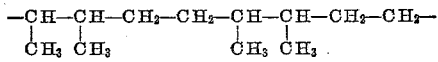

Such alternating copolymer also has a sterically regular structure which renders crystallizable the macromolecules of which it consists. This alternating copolymer can be also defined as a propylene polymer having a head-head/tail-tail enchainment and sterically regular.

The facts which lead to the above-mentioned interpretations are the following:

(a) By reducing the ethylene partial pressure, the moles content of butene-2 of the crude copolymer does not exceed the value of 40–50%, but approaches only asymptotically the 50% value (the theoretical value which corresponds to the alternating copolymer is 50.0%);

(b) By a further fractionation of the hexane extract of a copolymer having a mole content of butene-2 of 48–50% with boiling pentane, there are no remarkable changes of the butene-2 content in the extracted fraction and in the residue;

(c) The appearance of a high crystallinity characteristic of a new crystalline product;

(d) The presence of an infrared absorption band characteristic for the methylene sequences containing two $CH_2$ groups, together with the practical absence of characteristic bands for methylene sequences having more than two $CH_2$ groups;

(e) The impossibility of preparing homopolymers of butene-2 in the presence of the catalytic systems used in the process of the present invention. This leads also to the conclusion that in the copolymers the existence of sequences of monomeric units of butene-2 is impossible.

The ether extracts obtained from the crude ethylene-butene-2 copolymers having a butene-2 content higher than 35% in moles, have, as do the hexane extracts, a butene-2 content in moles of 48–50%. Unlike the heptane extracts, the ether extracts have a wax-like appearance and on X-ray examination show only a slight crystallinity. This crystallinity is similar to that observed for the alternate copolymers having stereo-regular structure which are insoluble in ether and which can be extracted with n-hexane. Therefore, one may conclude that such ether extracts consist of a linear alternate copolymer which, however, has a steric regularity remarkably lower than that of the hexane extracts which consist of a stereoregular alternate copolymer.

EXAMPLE 13

Into a reactor maintained under agitation and at a constant temperature of 0° C. under nitrogen, are introduced:

15 ml. toluene
0.0078 mole $TiCl_3$ violet and
0.0071 mole $(Al(C_2H_5)_3$

At this stage the nitrogen is removed from the reactor by means of an air pump and then 20 ml. cis-butene-2 are introduced into the reactor and condensed. The pressure in the reactor is raised to atmospheric pressure with nitrogen, and ethylene is then introduced until a pressure of 100 torr is reached.

After 20 hours, during which period the total pressure has been kept constant in the apparatus by introduction of ethylene, 0.4 g. polymer containing 4% by moles of butene-2 are obtained.

EXAMPLE 14

By operating as described in Examples 1–12, the copolymerization of butene-2 with ethylene is carried out by using 10 g. (0.179 mole) of pure cis-butene-2 and a catalyst prepared by adding 28 millimoles diethylaluminum monochloride to a solution consisting of 5.6 millimoles vanadyl chloride diethylate, $VOCl(OC_2H_5)_2$, in 30 ml. anhydrous toluene (catalyst freshly prepared under nitrogen at $-30°$ C.). The ethylene partial pressure is 100 torr.

The polymerization is carried out at $-30°$ C. for 8 hours. The polymerization is stopped and the crude copolymer is isolated as described in Examples 1–12. There results 0.36 g. of a white powder-like copolymer, having a molar content of butene-2 of 1–2%.

EXAMPLE 15

By proceeding as described in Examples 1–12, the copolymerization of n-pentene-2 with ethylene is carried out by using:

10 g. (0.143 mole) of a mixture of cis- and trans-n-pentene-2 purified by distillation over $Al(C_2H_5)_3$;

A catalyst prepared by adding 9.0 millimoles aluminum-tri-n-hexyl to a solution of 3.6 millimoles vanadium tetrachloride in 30 ml. anhydrous n-heptane (catalyst freshly prepared under nitrogen at $-30°$ C.);

An ethylene partial pressure of 100 torr.

The polymerization is carried out at $-30°$ C. for 7 hours. The copolymerization is stopped and the crude copolymer is removed as described in Examples 1–12. There results 1.90 g. of a pentene-2-ethylene copolymer which is white and powder-like, slightly elastic, and which has a pentene-2 molar content of 7%.

EXAMPLE 16

Using the apparatus and technique described in Examples 1 to 12, the copolymerization of cis-butene-2 with ethylene is carried out by using:

10 g. (0.179 mole) of pure cis-butene-2;

A catalyst freshly prepared by adding 9.0 millimoles of triethyl aluminum to a solution of 3.6 millimoles of vanadium tetrachloride in 37 cc. of anhydrous heptane kept under agitation at $-30°$ C.;

A partial ethylene pressure of 100 torr (ethylene marked with carbon 14).

The copolymerization is carried out at $-30°$ C. for 6 hours. The ethylene-cis butene-2 copolymer thus obtained is isolated and purified as described in Examples 1 to 12.

2.08 g. of a copolymer are obtained, which copolymer is a slightly rubbery and tacky white powder having an intrinsic viscosity, as determined in tetrahydronaphthalene at 135° C., of 2.25.

Both radiochemical and infrared analysis (based on the content of methylene groups) show a content of units derived from ethylene to be 63% by weight and a content of units derived from cis-butene-2 to be 37% by weight.

X-ray examination shows the presence of crystallinity due to an ethylene sequence together with that of the regularly alternated ethylene-cis butene-2 copolymer in the macromolecules.

EXAMPLE 17

With the apparatus and technique described in Examples 1 to 12, the copolymerization of cis-butene-2 with ethylene is carried out by using:

10 g. (0.179 mole) of pure cis-butene-2;

A catalyst freshly prepared by addition of 9 millimoles of aluminum trihexadecyl to a solution of 3.6 millimoles of vanadium tetrachloride in 37 cc. of anhydrous n-heptane, kept under agitation at $-30°$ C.;

An ethylene partial pressure of 100 torr (ethylene marked with carbon 14).

The copolymerization is carried out at $-30°$ C. for 6 hours. The ethylene-cis butene-2 copolymer thus obtained is isolated and purified as described in Examples 1 to 12.

1.92 g. of a copolymer are obtained, this copolymer being a white tacky plastic mass having an intrinsic viscosity, determined in tetrahydronaphthalene at 135° C., of 1.25.

Both radiochemical and infrared analysis (the latter based on the content of methyl groups) show a content of units derived from ethylene of 45% by weight and a content of units derived from cis-butene-2 of 55% by weight.

X-ray examination has shown that the copolymer obtained is substantially amorphous; only a small percentage of crystalline product can be observed.

EXAMPLE 18

With the apparatus and the technique described in Examples 1 to 12 the copolymerization of cis-butene-2 with ethylene is carried out by using:

10 g. (0.179 mole) of pure cis-butene-2;

A catalyst freshly prepared by adding 9.0 millimoles of n-octyl sodium to a solution of 3.6 millimoles of vanadium tetrachloride in 50 cc. of anhydrous heptane kept under agitation at −30° C.;

A partial ethylene pressure of 100 torr (ethylene marked with carbon 14).

The copolymerization is carried out at −30° C. for 6 hours.

The ethylene-cis butene-2 copolymer thus obtained is isolated and purified as described in Examples 1 to 12.

0.76 g. of a copolymer are obtained, this copolymer being a slightly tacky white powder having an intrinsic viscosity, determined in tetrahydronaphthalene at 135° C., of 2.5.

Both radiochemical and infrared analysis (based on the content of methyl groups) show a content of units derived from ethylene of 67% by weight and a content of units derived from cis-butene-2 of 33% by weight.

X-ray examination shows the presence of crystallinity due to ethylene sequences in the macromolecules.

EXAMPLE 19

With the apparatus and the technique described in Examples 1 to 12 the copolymerization of cis-butene-2 with ethylene is carried out by using:

10 g. (0.179 mole) of pure cis-butene-2;

A catalyst freshly prepared by adding 9.0 millimoles of diethyl beryllium to a solution of 3.6 millimoles of vanadium tetrachloride in 37 cc. of anhydrous n-heptane kept under agitation at −30° C.;

A partial ethylene pressure of 100 torr (ethylene marked with carbon 14).

The copolymerization is carried out at −30° C. for 6 hours. The ethylene-cis butene-2 copolymer thus obtained is isolated and purified as described in Examples 1 to 12.

1.24 g. of a copolymer are obtained, this copolymer being a white powder having an intrinsic viscosity, determined in tetrahydronaphthalene at 135° C., of 5.2.

Both radiochemical and infrared analysis (based on the content of methyl groups) show a content of units derived from ethylene of 92% by weight and a content of units derived from cis-butene-2 of 8% by weight.

The copolymer appears to be crystalline by X-ray examination.

EXAMPLE 20

With the apparatus and the technique described in Examples 1 to 12 the copolymerization of cis-butene-2 with ethylene is carried out by using:

10 g. (0.179 mole) of pure cis-butene-2;

A catalyst freshly prepared by adding 9.0 millimoles of n-butyl zinc to a solution of 3.6 millimoles of vanadium tetrachloride in 37 cc. of anhydrous n-heptane kept under agitation at −30° C.;

A partial ethylene pressure of 100 torr (ethylene marked with carbon 14).

The copolymerization is carried out at −30° C. for 6 hours. The ethylene-cis butene-2 copolymer thus obtained is isolated and purified as described in Examples 1 to 12.

1.75 g. of a copolymer are obtained, this polymer being a white powder having an intrinsic viscosity, determined in tetrahydronaphthalene at 135° C., of 3.1.

Both radiochemical and infrared analysis (based on the content of methyl groups) show a content of units derived from ethylene of 90% by weight and a content of units derived from cis-butene-2 of 10% by weight.

The copolymer appears to be crystalline by X-ray examination.

EXAMPLE 21

With the apparatus and the technique described in Examples 1 to 12 the copolymerization of cis-butene-2 with ethylene is carried out by using:

10 g. (0.179 mole) of pure cis-butene-2;

A catalyst freshly prepared by adding 9.0 millimoles of trihexyl aluminum to a solution of 3.6 millimoles of vanadium tetrachloride in 37 cc. of anhydrous n-heptane kept under agitation at −30° C.;

A partial ethylene pressure of 100 torr (ethylene marked with carbon 14).

The copolymerization is carried out at −30° C. for 6 hours. The ethylene-cis butene-2 copolymer thus obtained is isolated and purified as described in Examples 1 to 12.

1.25 g. of a copolymer are obtained, this copolymer being a white powder having an intrinsic viscosity, determined in tetrahydronaphthalene at 135° C., of 2.5.

Both radiochemical and infrared analysis (based on the content on the methyl groups) show a content of units derived from ethylene of 90% by weight and a content of units derived from cis-butene-2 of 10% by weight.

The copolymer appears to be crystalline by X-ray examination.

EXAMPLE 22

With the apparatus and the technique described in Examples 1 to 12 the copolymerization of cis-butene-2 with ethylene is carried out by using:

10 g. (0.179 mole) of pure cis-butene-2;

A catalyst freshly prepared by adding 9.0 millimoles of trihexyl aluminum to a solution of 3.6 millimoles of vanadyl trichloride ($VOCl_3$) in 37 cc. of anhydrous n-heptane kept under agitation at −30° C.;

A partial ethylene pressure of 100 torr (ethylene marked with carbon 14).

The copolymerization is carried out at −30° C. for 6 hours. The ethylene-cis butene-2 copolymer thus obtained is isolated and purified as described in Examples 1 to 12.

1.2 g. of a copolymer are obtained in the form of a compact white powder having an intrinsic viscosity, determined in tetrahydronaphthalene at 135° C., of 1.8.

Both radiochemical and infrared analysis (based on the content of methyl groups) show a content of units derived from ethylene of 77% by weight and a content of units derived from cis-butene-2 of 23% by weight.

The copolymer appears to be crystalline by X-ray examination.

EXAMPLE 23

With the apparatus and the technique described in Examples 1 to 12 the copolymerization of 1-phenyl butene-2 with ethylene is carried out by using:

10 cc. (8.85 g.) of phenylbutene-2

$$(C_6H_5-CH_2-CH=CH-CH_3)$$

previously distilled over metallic sodium;

A catalyst freshly prepared by adding 14.0 millimoles of diethyl aluminum monochloride to a solution of 2.8 millimoles of vanadium acetylacetonate in 30 cc. of anhydrous toluene, kept under agitation at −30° C.;

A partial ethylene pressure of 50 torr (ethylene marked with carbon 14).

The copolymerization is carried out at −30° C. for 7 hours. The ethylene-1-phenylbutene-2 copolymer thus obtained is isolated and purified as described in Examples 1 to 12.

0.28 g. of a copolymer are obtained in the form of a white powder having an intrinsic viscosity, determined in tetrahydronaphthalene at 135° C., of 1.8.

The copolymer thus obtained is not soluble in n-hexane and ether but is partially soluble in n-heptane.

Both radiochemical and infrared analysis (based on the content of methyl groups) show a content of units derived from ethylene of 93% by weight and a content of units derived from 1-phenyl butene-2 of 7% by weight.

The copolymer appears to be crystalline by X-ray examination.

Variations can of course be made without departing from the spirit of our invention.

Having thus described our invention what we desire to secure and claim by Letters Patent is:

1. A polymeric product obtained from the copolymerization of ethylene and butene-2, said product being made up of linear high molecular weight macromolecules in which the main chain contains units of the formula $$-CH_2-CH_2-\underset{|}{C}H-\underset{|}{C}H-$$
$$\phantom{-CH_2-CH_2-}CH_3\phantom{HH}CH_3$$

said product containing from about 30 to 50 mole percent of units derived from butene-2 and correspondingly from about 70 to 50 mole percent of units derived from ethylene, at least one ethylene unit, —CH₂—CH₂—, being between any two butene-2 units, $$-\underset{|}{C}H-\underset{|}{C}H-$$
$$CH_3\phantom{HH}CH_3$$

2. The poly-(3,4-dimethylbutamer) of claim 1 consisting of linear high molecular weight macromolecules formed by the repetition of units of the formula $$-CH_2-CH_2-\underset{|}{C}H-\underset{|}{C}H$$
$$\phantom{-CH_2-CH_2-}CH_3\phantom{HH}CH_3$$

3. The poly-(3,4-dimethylbutamer) of claim 2 having a sterically regular structure.

4. The poly-(3,4-dimethylbutamer) of claim 3, which is crystalline at room temperature, said crystallinity being characterized by the X-ray diffraction pattern shown in FIG. 1.

5. The poly-(3,4-dimethylbutamer) of claim 4, having a melting temperature of about 130° C.

6. A poly-(3,4-dimethyl-butamer-co-ethamer) according to claim 1, consisting of linear, high molecular weight macromolecules consisting of units $$-CH_2-CH_2-\underset{|}{C}H-\underset{|}{C}H-$$
$$\phantom{-CH_2-CH_2-}CH_3\phantom{HH}CH_3$$

and of an even number of methylene group sequences.

7. A poly-(3,4-dimethyl-butamer-co-ethamer) according to claim 6, having a crystallinity of the type of that of poly-(3,4-dimethyl-butamer).

8. The copolymer of claim 6, consisting of linear high molecular weight macromolecules, amorphous on X-ray, and having elastomeric properties.

9. A copolymer of butene-2 and ethylene according to claim 7, which copolymer can be extracted with boiling ether.

10. A copolymer of butene-2 with ethylene according to claim 7, which cannot be extracted with boiling ether but which can be extracted with boiling n-hexane.

11. A process for the preparation of a polymeric product of linear high molecular weight macromolecules in which the main chain contains units of the formula $$-CH_2-CH_2-\underset{|}{C}H-\underset{|}{C}H-$$
$$\phantom{-CH_2-CH_2-}CH_3\phantom{HH}CH_3$$

comprising copolymerizing in the liquid phase ethylene with butene-2, in the presence of a catalyst prepared from a transition metal compound wherein the metal is selected from Groups IV, V and VI of the Periodic Table and from an organometallic compound of a metal selected from Groups Ia, II and IIIa of the Periodic Table, the proportions of said ethylene and butene-2 being at least about 49 moles of butene-2 per mole of ethylene, whereby there is provided a polymeric product containing from about 30 to 50 mole percent of units deriving from butene-2 and correspondingly from about 70 to 50 mole percent of units derived from ethylene, at least one ethylene unit, —CH₂—CH₂—, being between any two butene-2 units, $$-\underset{|}{C}H-\underset{|}{C}H-$$
$$CH_3\phantom{HH}CH_3$$

12. The process of claim 11 wherein the catalytic system is dispersed in the liquid phase in which the copolymerization takes place.

13. The process of claim 11 wherein the catalytic system is wholly dissolved in the liquid phase in which the copolymerization occurs.

14. The process of claim 11 wherein said process is carried out at a temperature of from about −80 to +100° C.

15. The process of claim 11 wherein said process is carried out at a temperature of from about −50 to +50° C.

16. The process of claim 11 wherein the liquid phase consists of butene-2.

17. The process of claim 11 wherein said process is carried out in the presence of an inert solvent selected from the group consisting of aliphatic and aromatic hydrocarbons.

18. Thermoplastic materials containing the polymeric product of claim 1.

19. Crystalline thermoplastic materials according to claim 18.

20. Amorphous thermoplastic materials according to claim 18.

21. Fibers, films and other manufactured articles according to claim 19.

22. Elastomers according to claim 20.

References Cited by the Examiner

UNITED STATES PATENTS

| | | | |
|---|---|---|---|
| 2,921,872 | 1/1960 | McGlamery | 260—94.9 |
| 2,940,963 | 6/1960 | Denkowski | 260—88.2 |
| 3,008,940 | 11/1961 | Wagner et al. | 260—88.2 |

JOSEPH L. SCHOFER, *Primary Examiner.*

E. M. OLSTEIN, M. B. KURTZMAN,
*Assistant Examiners.*